(12) United States Patent
Liu et al.

(10) Patent No.: US 11,871,362 B2
(45) Date of Patent: Jan. 9, 2024

(54) POWER HEADROOM OPERATION FOR SUPPLEMENTARY UPLINK CARRIERS

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 318 days.

(21) Appl. No.: 16/764,100

(22) PCT Filed: Nov. 9, 2018

(86) PCT No.: PCT/EP2018/080773
§ 371 (c)(1),
(2) Date: May 14, 2020

(87) PCT Pub. No.: WO2019/096691
PCT Pub. Date: May 23, 2019

(65) Prior Publication Data
US 2020/0280933 A1    Sep. 3, 2020

(30) Foreign Application Priority Data

Nov. 16, 2017  (WO) ............... PCT/CN2017/111348

(51) Int. Cl.
*H04W 4/00* (2018.01)
*H04W 52/36* (2009.01)
(Continued)

(52) U.S. Cl.
CPC ......... *H04W 52/365* (2013.01); *H04W 72/21* (2023.01); *H04W 76/10* (2018.02); *H04W 72/0473* (2013.01)

(58) Field of Classification Search
CPC .................. H04W 52/365; H04W 72/0473
See application file for complete search history.

(56) References Cited

U.S. PATENT DOCUMENTS

| | | | |
|---|---|---|---|
| 2010/0296470 A1 | 11/2010 | Heo et al. | |
| 2016/0057712 A1* | 2/2016 | Wen ................ | H04W 52/365 370/329 |

(Continued)

OTHER PUBLICATIONS

Indian Office Action dated Nov. 9, 2021 for Patent Application No. 202047024718, consisting of 7-pages.

(Continued)

*Primary Examiner* — Bo Hui A Zhu
(74) *Attorney, Agent, or Firm* — Christopher & Weisberg, P.A.

(57) ABSTRACT

The invention concerns a method performed by a wireless device, UE, for signalling power headroom, PH to a network node, for a supplementary uplink carrier, SUL carrier, and a New Radio uplink carrier, NRUC, in a cell, the method comprising generating (800) a power headroom report, PHR, for the SUL carrier and the NR uplink carrier, and transmitting (810) the PHR to the network node; the invention further concerns a method performed by a base station for utilizing power headroom information for the SUL carrier, and the NRUC in a cell, the method comprising configuring a UE with at least one power headroom report, PHR, to support power headroom reporting for multiple uplink channels in the cell; the invention further concerns a corresponding wireless device, a base station and computer programs.

17 Claims, 22 Drawing Sheets

(51) Int. Cl.
  *H04W 76/10* (2018.01)
  *H04W 72/21* (2023.01)
  *H04W 72/044* (2023.01)

(56) References Cited

U.S. PATENT DOCUMENTS

2020/0280913 A1* 9/2020 Chen .................. H04W 48/12
2021/0185622 A1* 6/2021 Jiang .................. H04L 25/0226

OTHER PUBLICATIONS

Guangdong Oppo Mobile Telecom, "Discussion on PHR and Other Issues for LTE-NR Dual Connectivity", 3GPP TSG RAN WG1 Meeting NR#3, Nagoya, Japan, Sep. 18, 2017, pp. 1-4, R1-1715698, 3GPP.

Ericsson, "Power Headroom Reporting in NR", 3GPP TSG-RAN WG2 #100, Reno, USA, Nov. 27, 2017, pp. 1-4, R2-1713484, 3GPP.

Samsung, "PHR Format for NR", 3GPP TSG-RAN WG2 Meeting #99bis, Prague, Czech Republic, Oct. 9, 2017, pp. 1-6, R2-1710954, 3GPP.

Interdigital Inc., "Power Headroom Reporting for NR", 3GPP TSG-RAN WG2 Meeting #99bis, Prague, Czech Republic, Oct. 9, 2017, pp. 1-4, R2-1710664, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 15)", Technical Specification, 3GPP TS 36.331 V15.3.0, Sep. 1, 2018, pp. 1-918, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 15)", Technical Specification, 3GPP TS 36.321 V15.3.0, Sep. 1, 2018, pp. 1-127, 3GPP.

* cited by examiner

| C₇ | C₆ | C₅ | C₄ | C₃ | C₂ | C₁ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) | | | | | |
| R | R | $P_{CMAX,c}$ 1 | | | | | |
| P | V | PH (Type 1, PCell) | | | | | |
| R | R | $P_{CMAX,c}$ 2 | | | | | |
| P | V | PH (Type x, SCell 1) | | | | | |
| R | R | $P_{CMAX,c}$ 3 | | | | | |

...

| P | V | PH (Type x, SCell n) |
|---|---|---|
| R | R | $P_{CMAX,c}$ m |

*FIGURE 4*

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) | | | | | |
| R | R | $P_{CMAX,c}$ 1 | | | | | |
| P | V | PH (Type 2, PUCCH SCell) | | | | | |
| R | R | $P_{CMAX,c}$ 2 | | | | | |
| P | V | PH (Type 1, PCell) | | | | | |
| R | R | $P_{CMAX,c}$ 3 | | | | | |
| P | V | PH (Type x, SCell 1) | | | | | |
| R | R | $P_{CMAX,c}$ 4 | | | | | |

...

| P | V | PH (Type x, SCell n) |
|---|---|---|
| R | R | $P_{CMAX,c}$ m |

FIGURE 5

| P | V | PH( Type x, carrier 1) | Oct 1 |
|---|---|---|---|
| R | R | $P_{max,c11}$ | Oct 2 |
| P | V | PH( Type x, carrier 1) | Oct 3 |
| R | R | $P_{max,c12}$ | Oct 4 |
| P | V | PH( Type x, carrier 2) | Oct 5 |
| R | R | $P_{max,c21}$ | Oct 6 |
| P | V | PH( Type x, carrier 2) | Oct 7 |
| R | R | $P_{max,c22}$ | Oct 8 |

*FIGURE 6*

| C2 | C1 | R | R | R | R | R | R | Oct 1 |
|----|----|---|---|---|---|---|---|-------|
| P | V | PH( Type X, carrier Y) | | | | | | Oct 2 |
| R | R | Pmax,cy1 | | | | | | Oct 3 |
| P | V | PH( Type X, carrier Y) | | | | | | Oct 4 |
| R | R | Pmax,cy2 | | | | | | Oct 5 |
| | | | | | | | | Oct 6 |

FIGURE 7

POWER HEADROOM OPERATION FOR SUPPLEMENTARY UPLINK CARRIERS

TECHNICAL FIELD

The present disclosure generally relates to wireless communication systems, and specifically relates to power headroom reporting in a 3GPP New Radio, NR, wireless communication network.

BACKGROUND

Supplementary Uplink (SUL) carriers may be introduced into 5G/New Radio (NR)-compliant networks to improve the uplink coverage for the networks, as NR uplink carriers are deployed in relative high frequency bands that exhibit heightened propagation loss relative to 4G/LTE bands. The SUL carriers may be deployed at the low frequency region, for example, at the LTE band to help ensure that the uplink coverage of NR networks can be comparable with that in LTE.

The SUL carrier is not paired with any downlink frequency from a band-combination perspective. Instead, the SUL carrier and NR uplink, UL, carrier together are associated with a NR downlink, DL, carrier. From a technology potential point of view, there are two options to model SUL carrier. In the first option, the SUL carrier is modelled as a separate uplink carrier, different from the NR UL carrier. Both carriers are aggregated in the same way as the uplink carrier aggregation. So, the SUL carrier forms a separate Scell.

In the second option, SUL carrier and NR UL/DL carriers are in the same cell. The SUL carrier may be regarded as a separate UL configuration. The UE can maintain two UL configurations, while the UE may keep only one UL configuration active from time to time.

FIG. 1 schematically depicts exemplary coverage regions each of the SUL carrier, the NR UL carrier, and the NR DL carrier associated to a base station or gNB.

A power headroom indicating how much transmission power is left for a UE to use in addition to the power being used by current transmission may be reported to the network. In an embodiment, the power headroom, PH, may be described by the following equation:

PH=Max Transmission Power–PUSCH (physical uplink shared channel) Power

Thus, the PH may indicate, how much transmission power is left in the UE. If the power headroom value is positive, it may indicate that the UE may transmit more data; if it is negative, the UE already transmits at higher power that allowed.

The UE may report the power headroom to the network by means of a Power Headroom Report MAC control element. The network may use this report to estimate how much uplink bandwidth a UE can use for a specific subframe.

There may be certain triggers for to send a PHR (Power Headroom Report). One trigger may be that a path loss change is greater than a certain threshold. In addition or alternatively, the UE may periodically send the PHR, e.g. by means of timer periodically triggering the transmission of the PHR.

According to current 3GPP specifications, e.g. 3GPP TS 36.331, current version 15.3.0, the PHR configuration for a UE is comprised in an information element, IE, called MAC-MainConfig. There are both configurations with respect the PHR triggering and the MAC CE format for PHR content carrying. One set of parameters are applied for aggregated carriers belong to one MAC entity. For PHR triggering, there are three key parameters:

periodicPHR-Timer: the interval for the periodical PH report, prohibitPHR-Timer: the PH report is prohibited when this timer is running, which is used to avoid too frequent PHRs, and dl-PathlossChange: when the pathloss change of a carrier exceed this threshold, a new PHR is estimated. Whether the estimated PH is reported further depends on the status of the timers.

These parameters can be configured via RRC signaling, as shown below:

```
MAC-MainConfig ::=           SEQUENCE {
    phr-Config                   CHOICE {
        release                      NULL,
        setup                        SEQUENCE {
            periodicPHR-Timer            ENUMERATED {sf10, sf20, sf50, sf100, sf200,
                                             sf500, sf1000, infinity},
            prohibitPHR-Timer            ENUMERATED {sf0, sf10, sf20, sf50, sf100,
                                             sf200, sf500, sf1000},
            dl-PathlossChange            ENUMERATED {dB1, dB3, dB6, infinity}
        }
    }                                                  OPTIONAL,  -- Need ON
```

3GPP TS 36.321, current version 15.3.0, specifies multiple different media access control control elements (MAC CEs) for PH reporting. The PHR MAC control element for a single carrier has fixed size containing one byte (octet) with a PH field of 6 bits indicating the power headroom level and two reserved bits, as shown in FIG. 2.

As shown in FIG. 3, a first extended Power Headroom Report (PHR) MAC control element is identified by a MAC packet data unit (PDU) subheader with a logical channel identifier (LCID) (as specified in table 6.2.1-2).

As specified in section 6.1.3.6a of 3GPP TS 36.321, the Extended PHR MAC Control Elements are defined as follows:

Ci: this field indicates the presence of a PH field for the SCell. The Ci field set to "1" indicates that a PH field for the SCell with SCellIndex i is reported. The Ci field set to "0" indicates that a PH field for the SCell with SCellIndex i is not reported;

R: reserved bit, set to "0";

V: this field indicates if the PH value is based on a real transmission or a reference format. E.g. for Type 1 PH, V=0 indicates real transmission on PUSCH and V=1 indicates that a PUSCH reference format is used. For Type 2 PH, V=0 indicates real transmission on PUCCH/SPUCCH and V=1 indicates that a PUCCH/SPUCCH reference format is used. For Type 3 PH, V=0 indicates real transmission on SRS and V=1 indicates that an SRS reference format is used;

Power Headroom (PH): this field indicates the power headroom level. The length of the field is 6 bits;

P: this field indicates whether the MAC entity applies power backoff due to power management. The MAC entity shall set P=1 if the corresponding PCMAX,c field would have had a different value if no power backoff due to power management had been applied;

PCMAX,c: if present, this field indicates the PCMAX,c used for calculation of the preceding PH field.

Turning to FIGS. 4 and 5, exemplary second extended Power Headroom Report (PHR) MAC control elements are identified by a MAC PDU subheader with LCID e.g. as specified in table 6.2.1-2. They have variable sizes e.g. as defined in FIG. 6.1.3.6a-3, FIG. 6.1.3.6a-4 and FIG. 6.1.3.6a-5 of 3GPP TS 36.321. One octet with C fields is used for indicating the presence of PH per SCell when the highest SCell Index of the SCell with configured uplink is less than 8, otherwise four octets are used (see FIG. 5). A detailed description of the fields in the MAC CE listed above is being described in section 6.1.3.6a of 3GPP TS 36.321.

There currently exist certain challenges with respect to the above PHR formats. The SUL carrier may be located at the low frequency region while the NR carrier may be at a rather high frequency. This means that their propagation properties may differ a lot. The SUL carrier and the NR carrier are included in the same cell. According to LTE rules, there would be only one PHR configuration per cell for a UE. However, there are following challenges:

The two carriers may be deployed at very different frequencies with a large propagation difference;

The gNB (base station) receivers of two carriers may be non-collocated, so that the propagation difference can be large;

The two carriers may be configured with different close loop power control settings such as received power density PO, path loss scaling factor (alfa), power control step size;

The two carriers may be associated with different numerologies/SCS values, meaning they may apply different power control frequencies and power back-off settings.

The UE may transmit control signals on one carrier, but may transmit data (or user data herein) on another carrier. In one example, the UE transmits physical uplink control channel (PUCCH) signals one the SUL carrier, while keeping the data transmission on the NR carrier. In another example, the UE may transmit sounding reference signals (SRSs) on both carriers.

SUMMARY

It is an object of embodiments of the specification to provide an efficient power headroom configuration for different carriers in the same cell.

Certain aspects of the present disclosure and their embodiments may provide solutions to challenges as listed above. The example embodiments described herein apply multiple PHR configurations (or PHR formats) in a cell for a UE configured with an SUL carrier to extend the NR coverage in the uplink.

An embodiment concerns a method performed by a wireless device or user equipment, UE, for signalling power headroom, PH to a network node, for a supplementary uplink carrier, SUL carrier, and a New Radio uplink carrier, NRUC, in a cell, the method comprising generating a power headroom report, PHR, for the SUL carrier and the NR uplink carrier, and transmitting the PHR to the network node.

Another embodiment concerns a method performed by a base station for utilizing power headroom information for a supplementary uplink, SUL, carrier, and a New Radio uplink carrier, NRUC, in a cell, the method comprising configuring a UE with at least one power headroom report, PHR, to support power headroom reporting for multiple uplink channels in the cell.

Another embodiment concerns a wireless device configured to perform the steps of generating a power headroom report, PHR, for the SUL carrier and the NR uplink carrier and transmitting the PHR to the network node.

Another embodiment concerns the wireless device comprising processing circuitry and memory, the memory containing instructions executable by the processing circuitry whereby the wireless device is configured to perform the steps of generating a power headroom report, PHR, for the SUL carrier and the NR uplink carrier, and transmitting the PHR to the network node.

Another embodiment concerns a computer program comprising instructions which, when executed by at least one processor of a wireless device, causes the wireless device to perform the steps of generating a power headroom report, PHR, for the SUL carrier and the NR uplink carrier, and transmitting the PHR to the network node.

Another embodiment concerns a base station configured to perform the step of configuring a UE with at least one power headroom report, PHR, to support power headroom reporting for multiple uplink channels in the cell.

Another embodiment concerns a base station comprising: processing circuitry and memory, the memory containing instructions executable by the processing circuitry whereby the base station is configured to perform the step of configuring a UE with at least one power headroom report, PHR, to support power headroom reporting for multiple uplink channels in the cell.

Another embodiment concerns a computer program comprising instructions which, when executed by at least one processor of a base station, causes the base station to carry out the step of configuring a UE with at least one power headroom report, PHR, to support power headroom reporting for multiple uplink channels in the cell.

BRIEF DESCRIPTION OF THE DRAWINGS

FIGS. 3, 4 and 5 show exemplary extended PHR MAC control elements according to 3GPP specifications.

FIGS. 6 and 7 show proposed exemplary extended PHR MAC control elements adapted to report power headroom information for different carriers in a cell.

DETAILED DESCRIPTION

Some of the embodiments contemplated herein will now be described more fully hereinafter with reference to the accompanying drawings.

Figure 1:
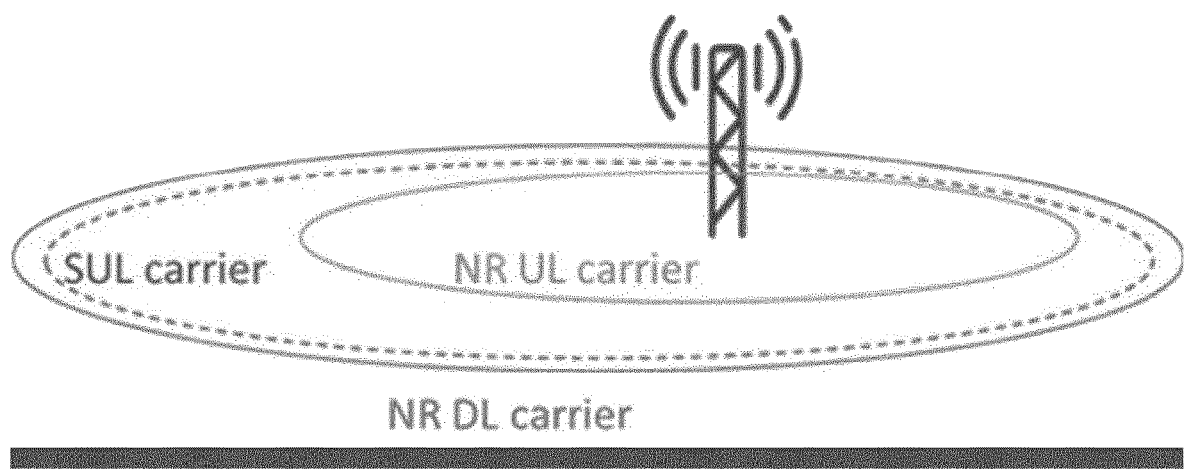
FIG. 1 schematically depicts coverage regions of the SUL carrier, the NR UL carrier and the NR DL carrier.
Figure 2:
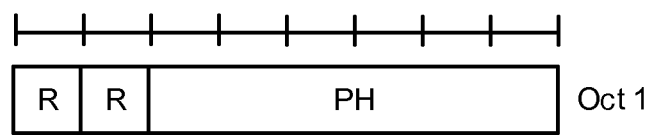
FIG. 2 shows a Power Headroom Report (PHR) MAC control element for a single carrier according to 3GPP specifications.
Figure 3:
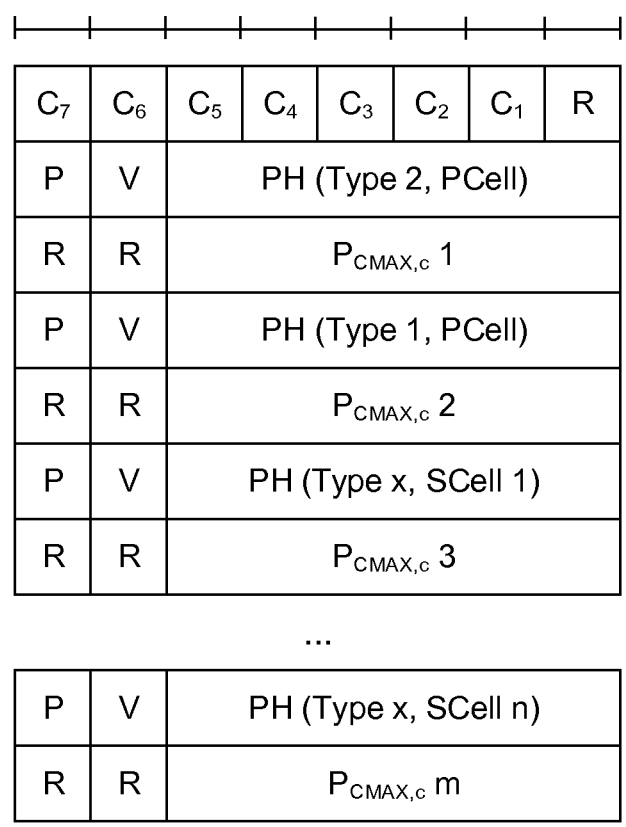

In an embodiment, a wireless device or user equipment, UE, applies a plurality of PHR formats, e.g. Media Access Control, MAC, CE formats, in a cell, where a first carrier is configured to extend a coverage of a second carrier or NR carrier in the uplink as depicted in FIG. 1.

The first carrier may be a supplementary uplink, SUL, carrier that is configured to extend a coverage of the NR carrier.

The UE may generate a PHR information by using a first MAC CE format to be reported to the base station or gNB (as being referred to in 5G specifications) when the UE transmits both control signals and PUSCH data on the same carrier (either on the SUL carrier or on the NR carrier).

The UE may use another PHR format to provide power headroom, PH, information for both the SUL carrier and the NR carrier (such behaviors are different from that in LTE where a UE uses a single format in a cell).

Such format may be as used for PHR MAC Control Elements in LTE, while the cell index may be replaced with the carrier index. A new LCID (logical channel identifier) may be introduced to distinguish this PHR format with that in a CA (carrier aggregation) scenario. This new LCID may be named as "SUL carrier Power Headroom Report MAC CE".

In an embodiment, a UE applies two PHR formats in a cell where a first carrier (SUL carrier) is configured to extend the NR coverage (second carrier) in the uplink.

The UE may apply a first PHR format (as used in LTE) to report PHR when the UE transmits both control signals (and PUSCH) data on the same carrier (either on the SUL carrier or on an NR carrier).

The UE may use a second PHR format to provide PH values for both the SUL carrier and the NR carrier (the second PHR format may be a new format to allow the UE report PH values for both the SUL carrier and the NR carrier). The format may comprise IDs each indicating the PH value for the SUL carrier and the PH value for the NR carrier.

The UE may be configured to always use the second PHR format no matter which carrier is scheduled for PUSCH transmission, i.e. a single PHR format is configured.

Examples of the PHR formats of the above-described embodiments are shown in FIG. 6 and FIG. 7, The formats may comprise values referred to as Pmax,c11, Pmax,c12, Pmax,c21 and Pmax,c22 in FIG. 6 indicative of a maximum (estimated) transmission power, Pcmax, used for a calculation of a preceding PH field for the corresponding carriers.

By way of example, the fields depicted in FIGS. 6 and 7 may have the following meaning:

R: Reserved bit, set to "0";

V: This field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX}$, field, and V=1 indicates that the octet containing the associated $P_{MAX}$, field is omitted;

P: This field indicates whether the MAC entity applies power backoff due to power management. The MAC entity shall set P=1 if the corresponding $P_{CMAXc}$ field would have had a different value if no power backoff due to power management had been applied;

PH (Type x, carrier ½): Power Headroom This field indicates the power headroom level for a given Type X and carrier 1 or 2 respectively. The length of the field is 6 bits. The reported PH and the corresponding power headroom levels are shown in Table 6.1.3.8-1 (the corresponding measured values in dB for the NR Serving Cell are specified in TS 38.133 while the corresponding measured values in dB for the E-UTRA Serving Cell are specified in TS 36.133);

$P_{MAX,cii\ (ii=11,\ 12,\ 21\ or\ 22)}$: If present, this field indicates the $P_{CMAX,f,c}$ or $\tilde{P}_{CMAX,f,c}$ (as specified in TS 38.213) used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 while the corresponding measured values in dBm for the E-UTRA Serving Cell are specified in TS 36.133).

In above examples, the PH fields occupy 6 bits; if it may be deemed necessary to extend the size of PH field, R field or P filed may be used to extend the size of PH field.

The UE may split a maximum (allowed or available) transmission power between two (or more) carriers. For the different carriers, the maximum allowed transmission power may be different, e.g. depending on each a data activity. As mentioned, the PHR for both carriers may be calculated (or estimated) accordingly.

As shown in FIG. 6, a PHR can comprise PHs (and corresponding maximum transmission power values) for both carriers, e.g. a first PH field for the first carrier (e.g. the SUL carrier) and a second PH field for the second carrier (e.g. the NR carrier).

As shown In FIG. 7, a PHR may comprise PHs for one or two carriers. This format is applicable both when the UE transmits control signals and data on both carriers, and on only one of the two carriers.

In an embodiment, a UE applies two PHR formats (i.e. Media Access Control Control Element (MAC CE) formats) in a cell where an SUL carrier is configured to extend the NR coverage in the uplink. In this example embodiment, the UE applies the PHR MAC control element as in LTE, to report PHR when the UE transmits both control signals and PUSCH data on the same carrier (either the SUL carrier or an NR carrier). In addition, the UE uses another PHR format to provide PH values for both the SUL carrier and the NR carrier.

In contrast to the LTE behavior of existing networks, the aspects of this embodiment are different in that multiple PHR report formats can be used in a cell, whereas an LTE UE uses a single format. The second PHR format of the present embodiment may be one of the Extended Power Headroom Report MAC Control Elements as in LTE (while the cell index is replaced with the carrier index). In order to distinguish this PHR format with that in a carrier aggregation (CA) scenario, a new logical channel identifier (LCID) can be introduced. This new LCID may be named as "SUL carrier Power Headroom Report MAC CE".

In another embodiment, a UE applies two PHR formats in a cell where an SUL carrier is configured to extend the NR coverage in the uplink. Like the embodiment above, the UE applies the first PHR MAC control element as in LTE, to report PHR when the UE transmits both control signals and PUSCH data on the same carrier (either the SUL carrier or an NR carrier). The UE uses the second PHR format to provide PH values for both the SUL carrier and the NR carrier. The second PHR format is a new format to allow the UE report PH values for both the SUL carrier and the NR carrier. The new format may comprise the indices for both the SUL carrier and the NR carrier. The UE may be configured to always use the second PHR format no matter which carrier is scheduled for PUSCH transmission, i.e. a single PHR format is configured.

In another embodiment, a UE is configured with two PHR configurations. One PHR configuration is associated to the SUL carrier, while another PHR configuration is associated to the NR carrier.

The UE may choose a suitable PHR configuration (out of the configured PHR configurations) according to the carrier that is (currently) active, e.g. the carrier that is used to transmit data on its PUSCH channel.

Each PHR configuration may comprises at one or a plurality of the following parameters:
- a time interval for a periodic PHR-timer to trigger a periodical PH report.
- a time interval for a prohibit PHR-timer, such that the PH report is prohibited when this timer is running (to avoid too frequent PHRs).
- A threshold value for a dl-pathloss change, such that when the pathloss change of a carrier exceed this threshold, a new PHR is estimated. Specifically the parameters may be named as follows:
- periodicPHR-Timer, the interval for the periodical PH report.
- prohibitPHR-Timer, the PH report is prohibited when this timer is running, which is used to avoid too frequent PHRs.
- dl-PathlossChange: when the pathloss change of a carrier exceed this threshold, a new PHR is estimated.

Whether the estimated PH is reported may further depend on a status of each of the timers.

In addition or instead of the aforementioned PHR triggers, further PHR trigger events may be provided, e.g.:
- adding a new SUL carrier to extend the UL coverage (such that a PHR is be triggered when the UE adds an SUL carrier),
- removing a SUL carrier (such that a PHR is triggered when the UE removes an SUL carrier)
- changing a PHR (such that a PHR is triggered when the UE has changed its current SUL carrier with a new SUL carrier,
- switching between an SUL carrier and an NR carrier (such that a PHR is triggered when the UE switches between an SUL carrier and an NR carrier for PUSCH transmission, and/or
- starting a transmission of UL control signals on one carrier, while UL data is transmitted on another carrier (such that a PHR is triggered when the UE starts the transmission of UL control signals on one carrier, while it transmits the UL data on another carrier).

As the allowed maximum transmit power may be different for different UL carriers, the PH range and or granularity for each carrier may different and may be adapted accordingly (lower power→higher granularity). Different tables for different power headroom levels may be provided (e.g. having different granularities).

In an aspect, the UE chooses a suitable PHR configuration according to which carrier is active, e.g., which carrier is used to transmit data (or "user data" as opposed to control data or control signaling) on its Physical Uplink Shared Channel (PUSCH).

Furthermore, besides the existing LTE PHR triggers, several additional PHR trigger events are defined for the embodiments described herein, including one or more of the following:
1) A PHR can be triggered when the UE adds an SUL carrier to extend the UL coverage
2) A PHR can be triggered when the UE removes an SUL carrier
3) A PHR can be triggered when the UE has changed its current SUL carrier with a new SUL carrier
4) A PHR can be triggered when the UE switches between an SUL carrier and an NR carrier for PUSCH transmission
5) A PHR can be triggered when the UE starts the transmission of UL control signals on one carrier, while transmits the UL data on another carrier In a further aspect of the embodiment, considering that the allowed maximum transmit power for different UL carrier can be different, the PH range can be differentiated for different UL carriers. Furthermore, a new table for power headroom levels may be designed, e.g. with finer granularity, if necessary.

Figure 8:
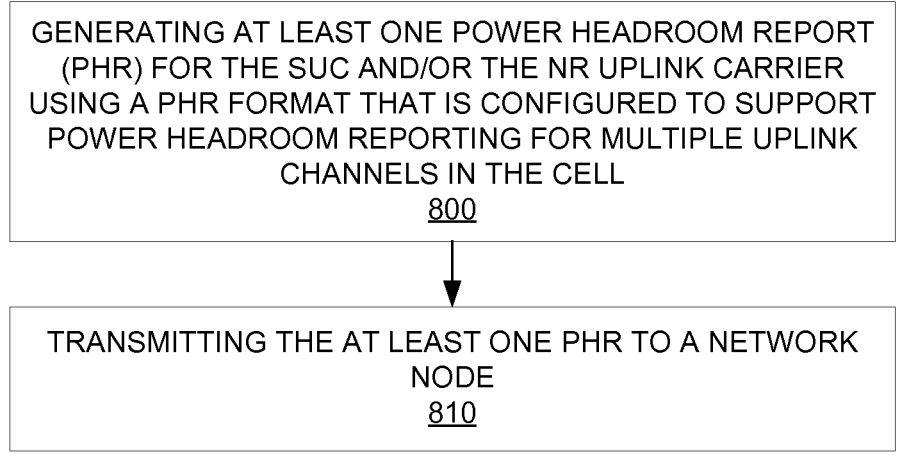
FIG. 8 is an exemplary flow chart of steps performed in a wireless device.

With the example embodiments above in mind, FIG. 8 depicts a method in accordance with particular embodiments. The method is performed by a wireless device (or UE) for signalling power headroom for a supplementary uplink carrier (SUL Carrier or SUC) and/or a New Radio uplink carrier (NRUC) in a cell. The method includes, at block 800, generating at least one power headroom report (PHR) for the SUL carrier and/or the NR uplink carrier using a PHR format that is configured to support power headroom reporting for multiple uplink channels in the cell. In other words, the PHR format supports the separate PH reporting of SUL carrier and NR uplink channels such that the PHR of carriers at high frequencies and carriers at lower frequencies can be differentiated and separately triggered so that the PHs for all carriers can be reported in time with optimized overhead. In addition, at block 810, the method can include transmitting the at least one PHR to a network node (e.g. eNB or gNB).

The example method may include additional aspects. For instance, the PHR format can include at least one Extended Power Headroom Report MAC Control Element for identifying one or both of the SUL carrier and NRUC as a target of the PHR, and this at least one Extended Power Headroom Report MAC Control Element can include a logical channel identifier (LCID) identifying the target channel of the PHR.

Additionally, the PHR can include power headroom (PH) information for one or both of the SUL carrier and the NRUC as indicated by one or more carrier-specific indices in the PHR.

In some examples, the PH information for one or both of the SUL carrier and the NRUC may be indicated in terms of a maximum power used for calculation of a previous PH field. Furthermore, in some embodiments, the PHR can split the maximum power between the SUL carrier and the NRUC. In some examples, the maximum power may depend on user data transmission over a target channel for the PHR.

Furthermore, the SUL carrier and the NRUC may each have an associated PHR format in some embodiments, which may be the same, though they may be different. In an aspect, the PHR format for each of the SUL carrier and the NRUC can be selected by the wireless device based on whether the carrier is to carry user data on a shared uplink channel (e.g. PUSCH).

In addition, the PHR format for each of the SUL carrier and the NRUC can include one or more of the following parameters:
- an interval for a periodic PH report (periodicPHR-Timer),
- a timer during which PH reporting is prohibited (prohibitPHR-Timer),
- a pathloss change threshold value (dl-PathlossChange).

Furthermore, one or more of the following PHR triggers may be implemented for reporting PH to the network node:
- when the UE adds an SUL carrier to extend the UL coverage,
- when the UE removes an SUL carrier,
- when the UE has changed its current SUL carrier with a new SUL carrier,
- when the UE switches between an SUL carrier and an NR carrier for PUSCH transmission,
- when the UE starts the transmission of UL control signals on one carrier, while transmits the UL data on another carrier.

In addition, as introduced above, the PH range can be different for the SUL carrier and the NRUC. In some examples, as well, the UE/wireless device can select the PHR format based on which of the SUL carrier and the NRUC is scheduled to carry control signalling and/or user data. Moreover, the PHR reported to the network node can include PH information for one of the SUL carrier or the NRUC.

Figure 9:
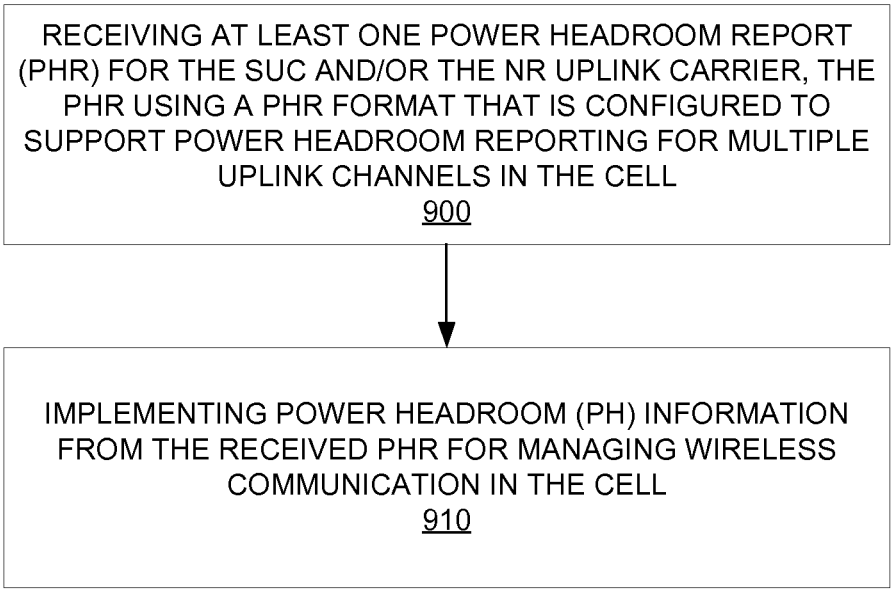
FIG. 9 is an exemplary flow chart of steps performed in a network node.

FIG. 9 depicts a method in accordance with other particular embodiments. The method is performed by a base station/network node for utilizing power headroom information for a supplementary uplink carrier (SUC) and/or a New Radio uplink carrier (NRUC) in a cell. In an aspect, the example method can include, at block 900, receiving at least one power headroom report (PHR) for the SUL carrier and/or the NR uplink carrier, the PHR using a PHR format that is configured to support power headroom reporting for multiple uplink channels in the cell. In addition, at block 910, the method can include the base station/gNB/eNB implementing power headroom (PH) information from the received PHR for managing wireless communication in the cell. Furthermore, features introduced above related to the nature of the PHR formats, the PHRs themselves, etc. (including those in reference to the method of FIG. 8) are imputed on the PHR formats, the PHRs, etc. of FIG. 9.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
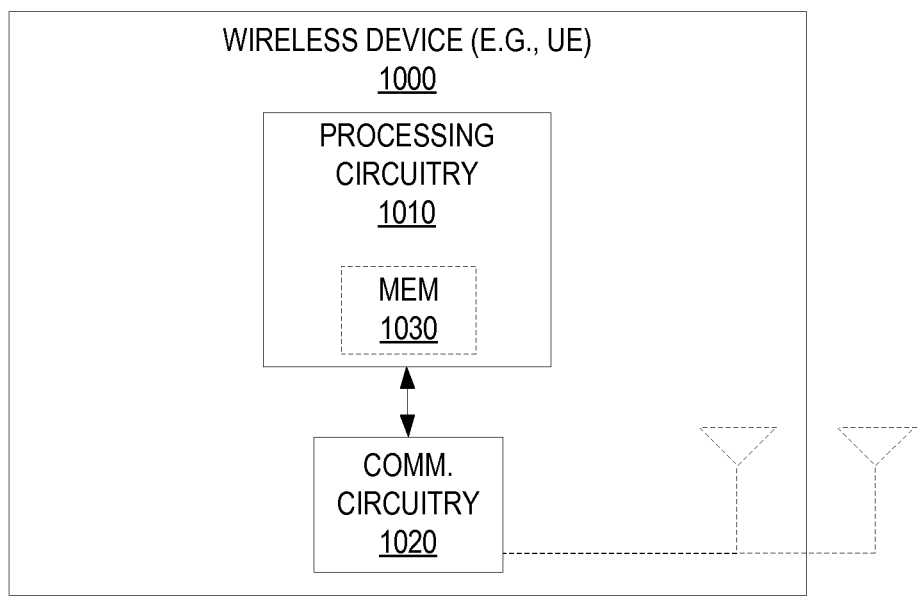
FIG. 10 is a block diagram with physical blocks of an exemplary wireless device.

FIG. 10 for example illustrates a wireless device 1000 as implemented in accordance with one or more embodiments. As shown, the wireless device 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless device 1000. The processing circuitry 1010 is configured to perform processing described above, such as by executing instructions stored in memory 1030. The processing circuitry 1010 in this regard may implement certain functional means, units, or modules.

Figure 11:
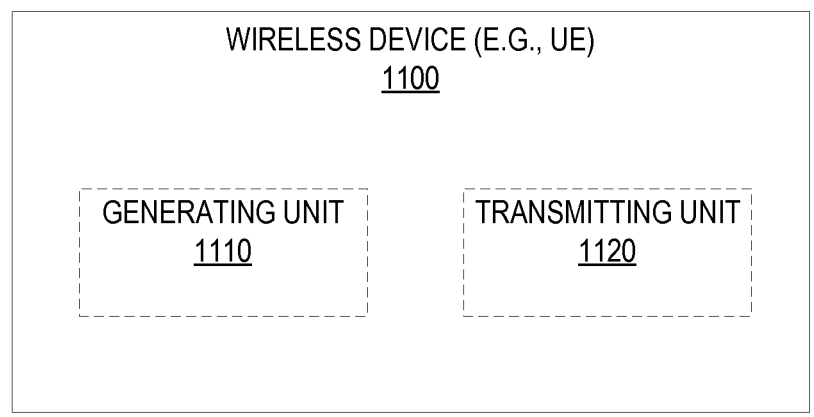
FIG. 11 is a block diagram with logical blocks of an exemplary wireless device.
Figure 14:
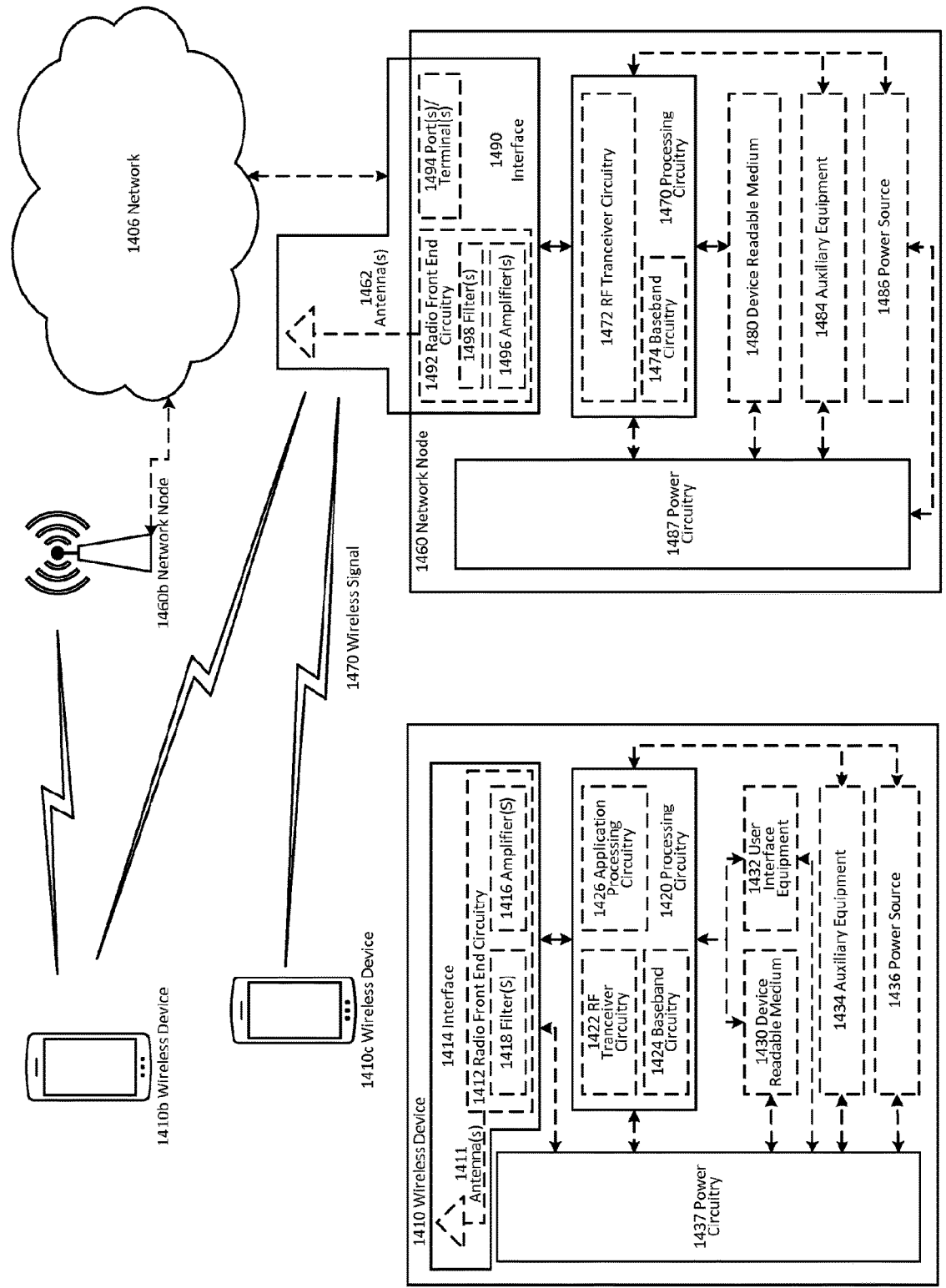
FIG. 14 schematically illustrates a telecommunication network comprising network nodes and wireless devices.

FIG. 11 illustrates a schematic block diagram of an wireless device 1100 in a wireless network according to still other embodiments (for example, the wireless network shown in FIG. 14). As shown, the wireless device 1100 implements various functional means, units, or modules, e.g., via the processing circuitry 1010 in FIG. 10 and/or via software code. These functional means, units, or modules, e.g., for implementing the method(s) herein, include for instance: generating unit 1110 and transmitting unit 1120, respectively configured to perform the aspects of blocks 800 and 810 of the method of FIG. 8.

Figure 12:
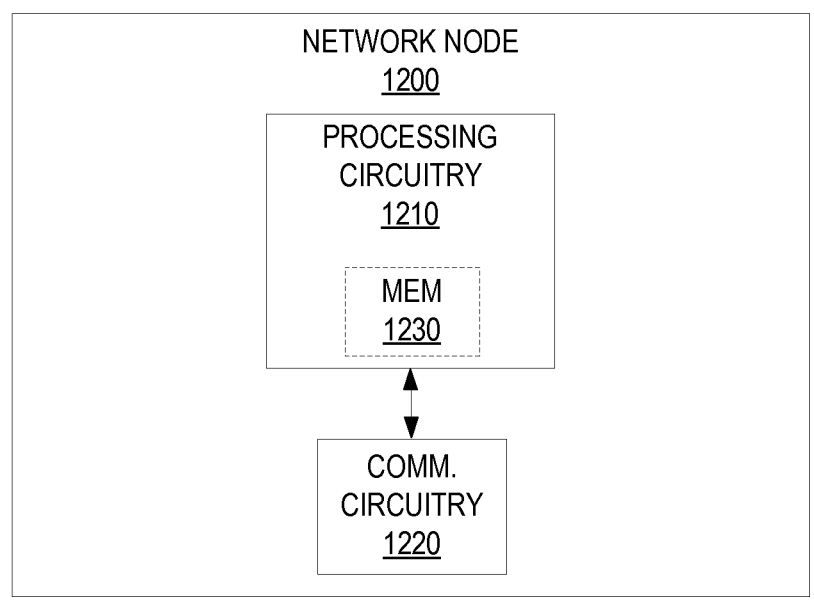
FIG. 12 is a block diagram with physical blocks of an exemplary network node.

FIG. 12 illustrates a network node 1200 as implemented in accordance with one or more embodiments. As shown, the network node 1200 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above, such as by executing instructions stored in memory 1230. The processing circuitry 1210 in this regard may implement certain functional means, units, or modules.

Figure 13:
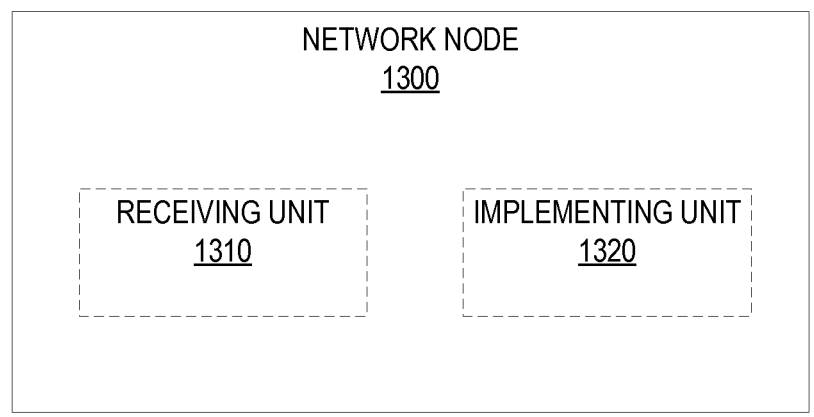
FIG. 13 is a block diagram with logical blocks of an exemplary network node.

FIG. 13 illustrates a schematic block diagram of an network node 1300 in a wireless network according to still other embodiments (for example, the wireless network shown in FIG. 14). As shown, the network node 1300 implements various functional means, units, or modules, e.g., via the processing circuitry 1210 in FIG. 12 and/or via software code. These functional means, units, or modules, e.g., for implementing the method(s) herein, include for instance: receiving unit 1310 and implementing unit 1320, respectively configured to perform the aspects of blocks 900 and 910 of FIG. 9.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and Wireless Devices or UEs 1410, 1410b, and 1410c. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
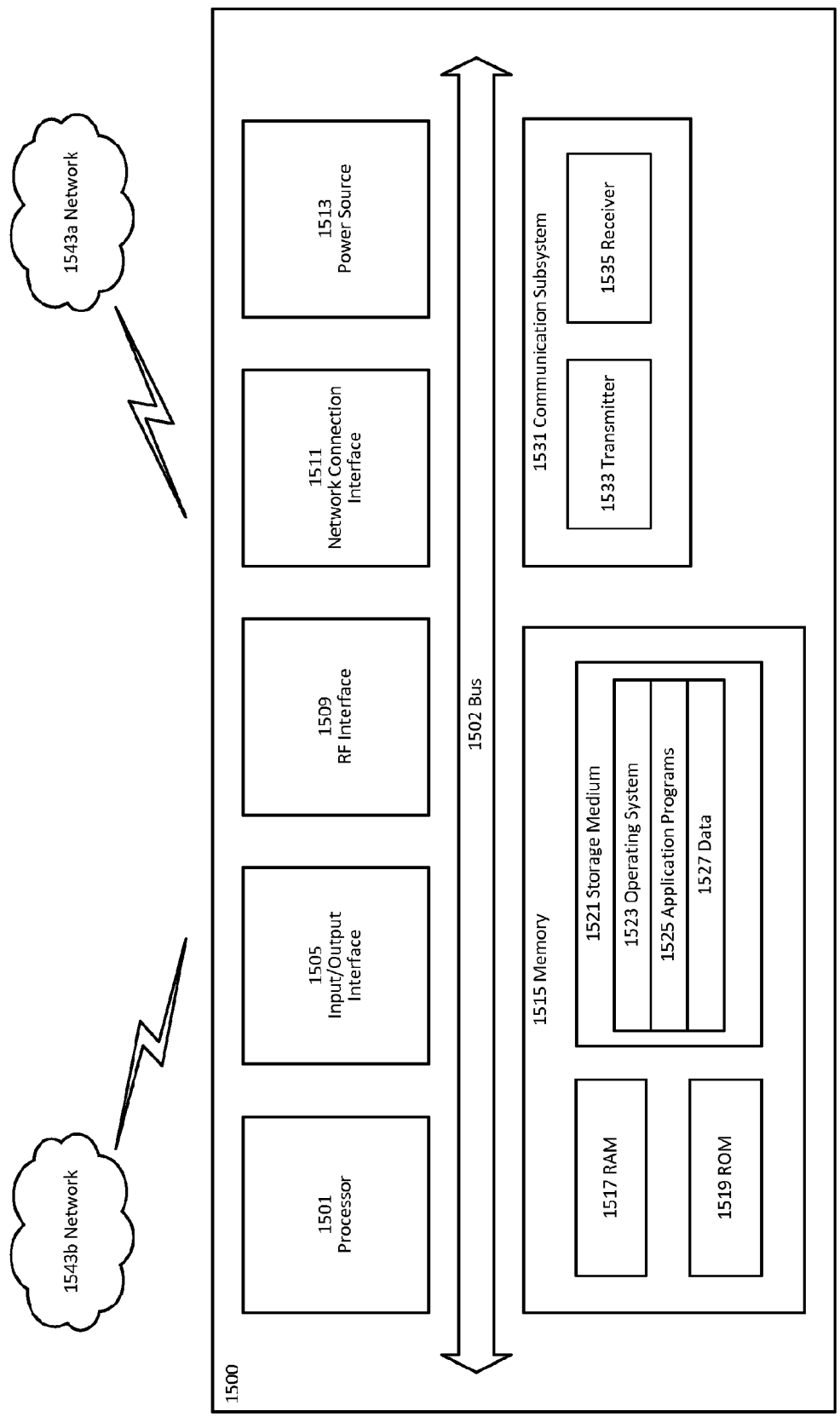
FIG. 15 schematically illustrates physical blocks of a wireless device. to a host computer according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the 3rd Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeably. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543*a*. Network 1543*a* may encompass wired and/or wireless networks such as a local-area network (LAN), a wide-area network (WAN), a computer network, a wireless network, a telecommunications network, another like network or any combination thereof. For example, network 1543*a* may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543*b* using communication subsystem 1531. Network 1543*a* and network 1543*b* may be the same network or networks or different network or networks. Communication subsystem 1531 may be configured to include one or more transceivers used to communicate with network 1543*b*. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543*b* may encompass wired and/or wireless networks such as a local-area network (LAN), a wide-area network (WAN), a computer network, a wireless network, a telecommunications network, another like network or any combination thereof. For example, network 1543*b* may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
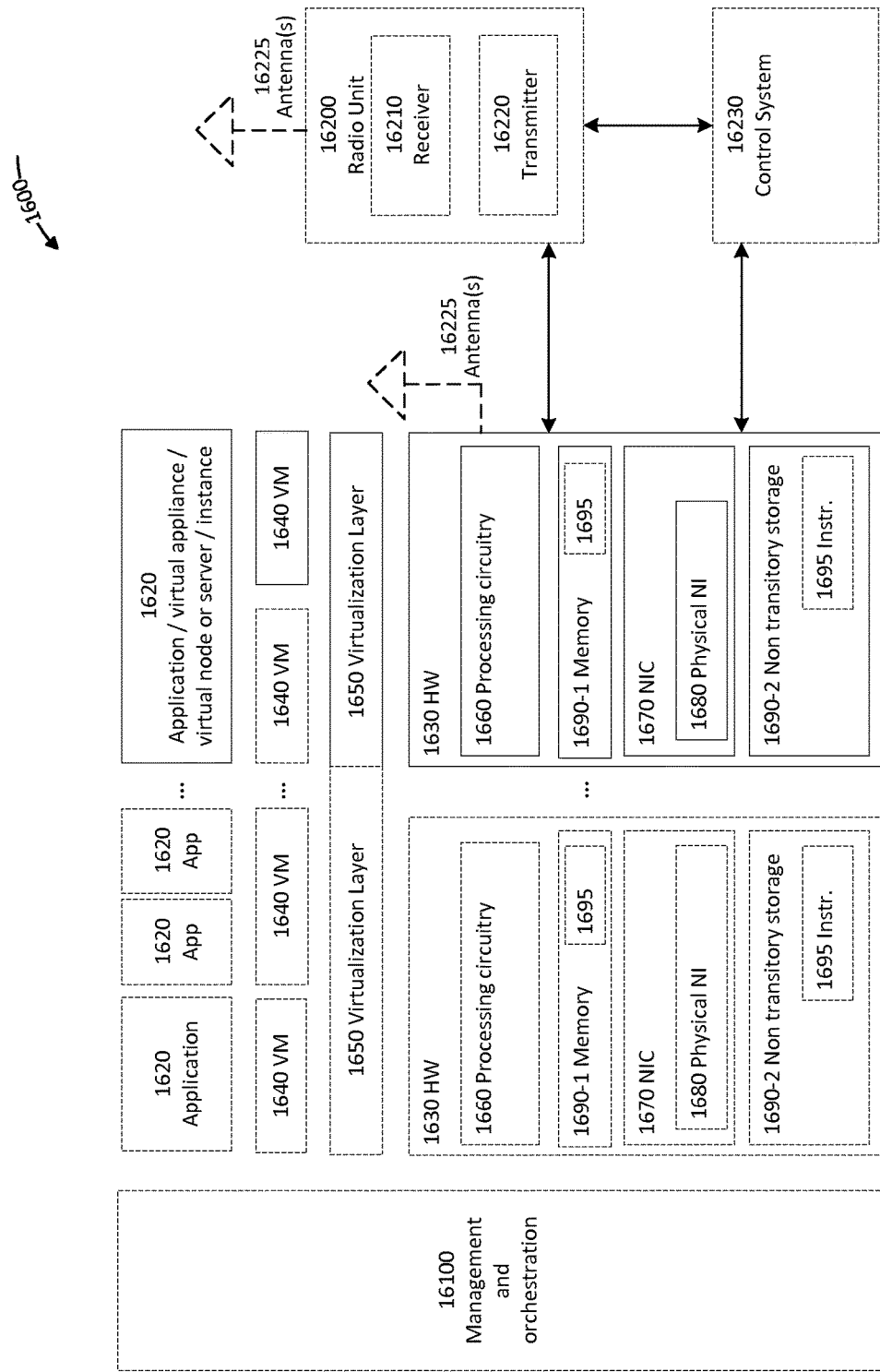
FIG. 16 is a schematic block diagram illustrating a virtualization environment.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
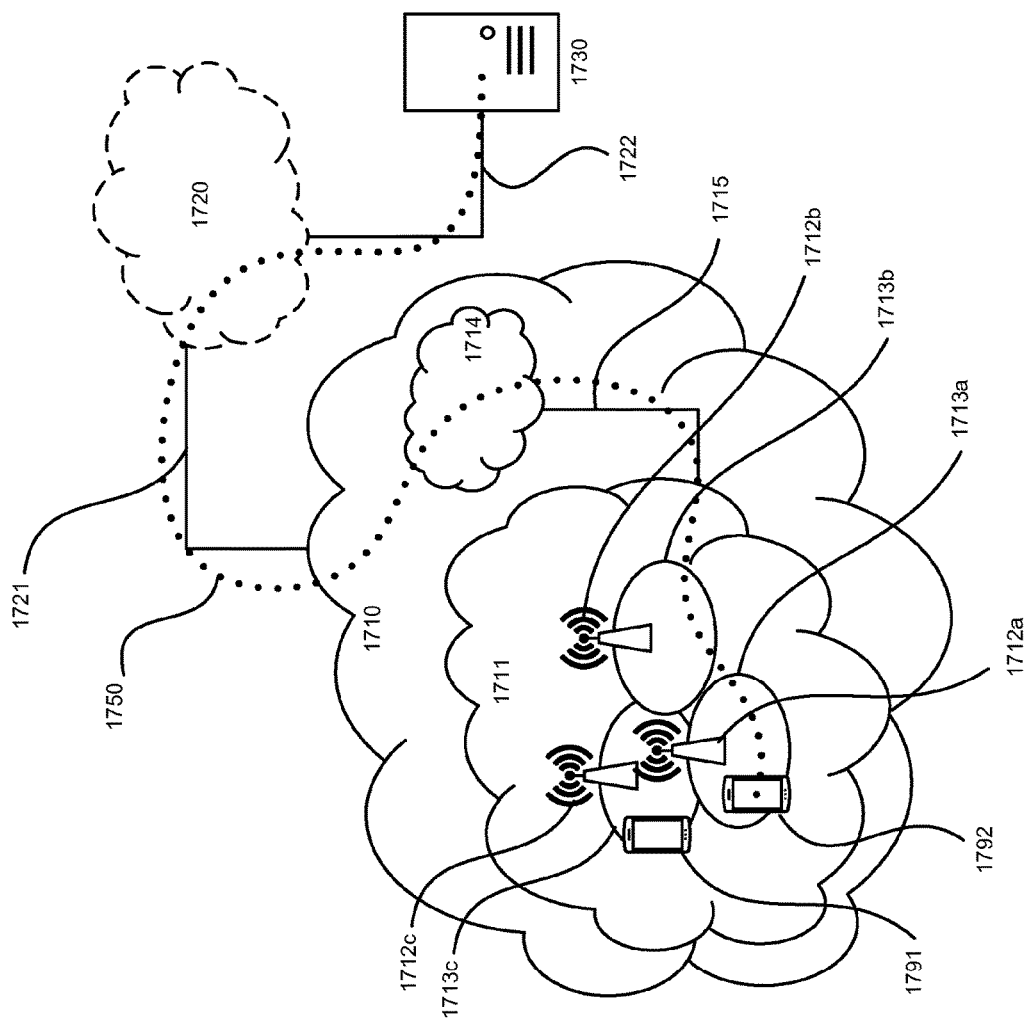
FIG. 17 is a schematic block diagram of a host computer communicating via a base station with a wireless device over a partially wireless connection.

FIG. 17 illustrates a telecommunication network connected via an intermediate network to a host computer in accordance with some embodiments. In particular, with reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 18:
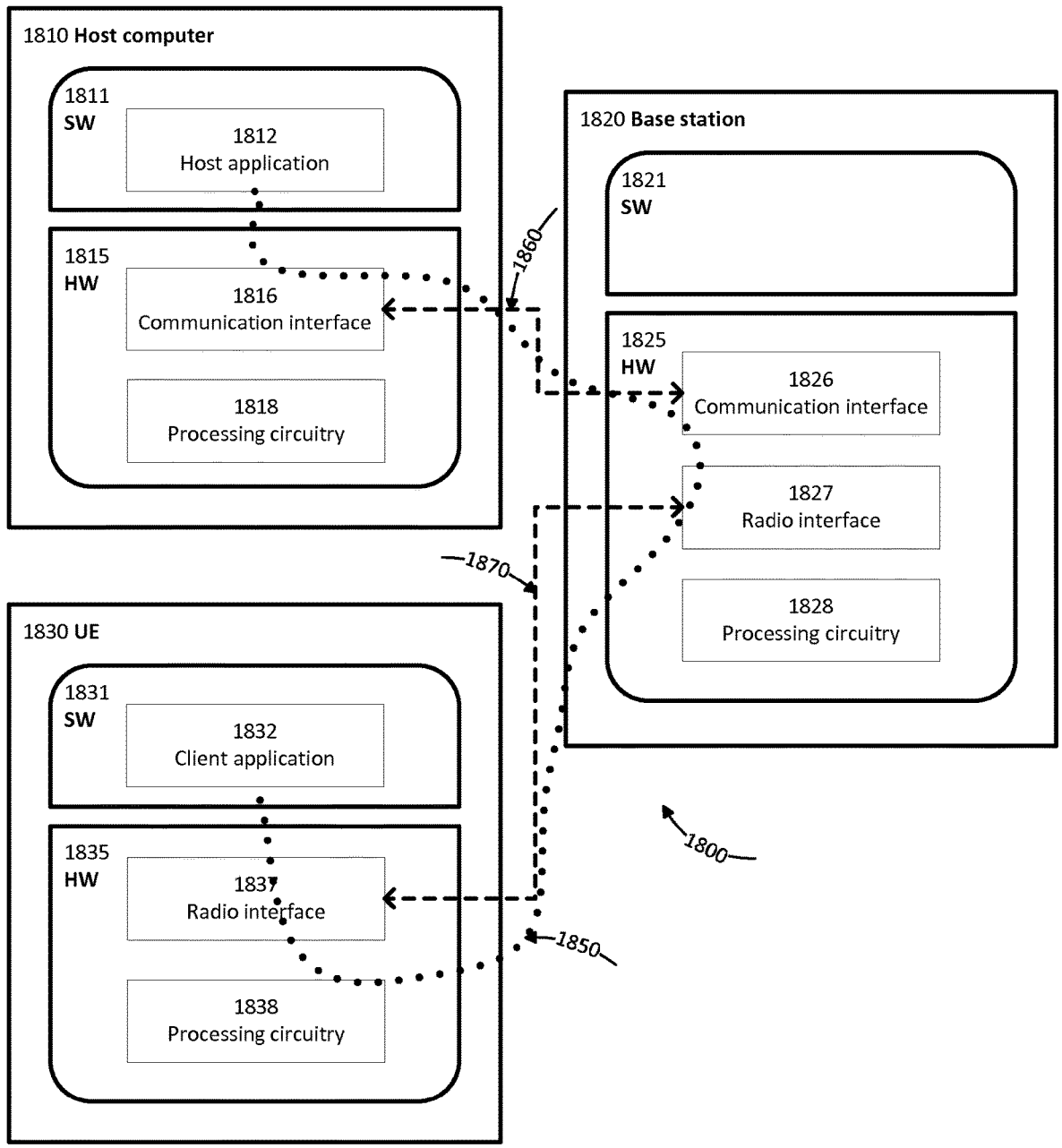
FIG. 18 is a schematic block diagram of a host computer communicating with a wireless device via a base station.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 18 may be similar or identical to host computer 1730, one of base stations 1712a, 1712b, 1712c and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may improve the power efficiency and overhead of the system as a whole and thereby provide benefits such as overall system economy, resource and power utilization, and communication speed.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
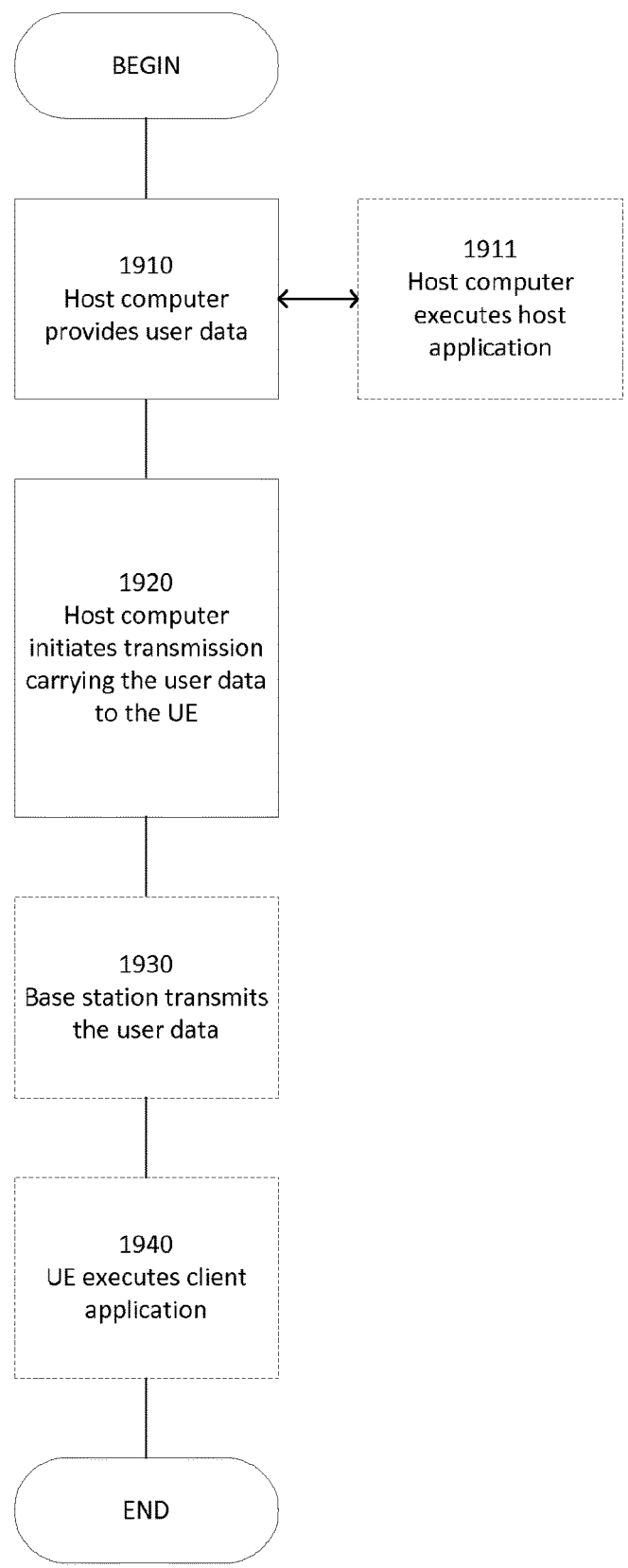
FIGS. 19 to 22 are flowcharts illustrating methods implemented in a communication system including a host computer, a base station and a wireless device.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
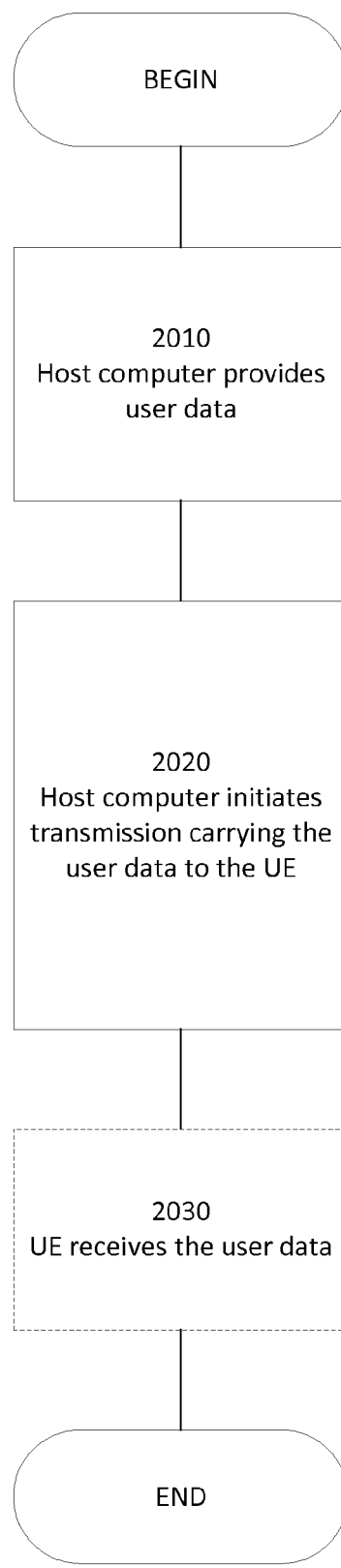

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
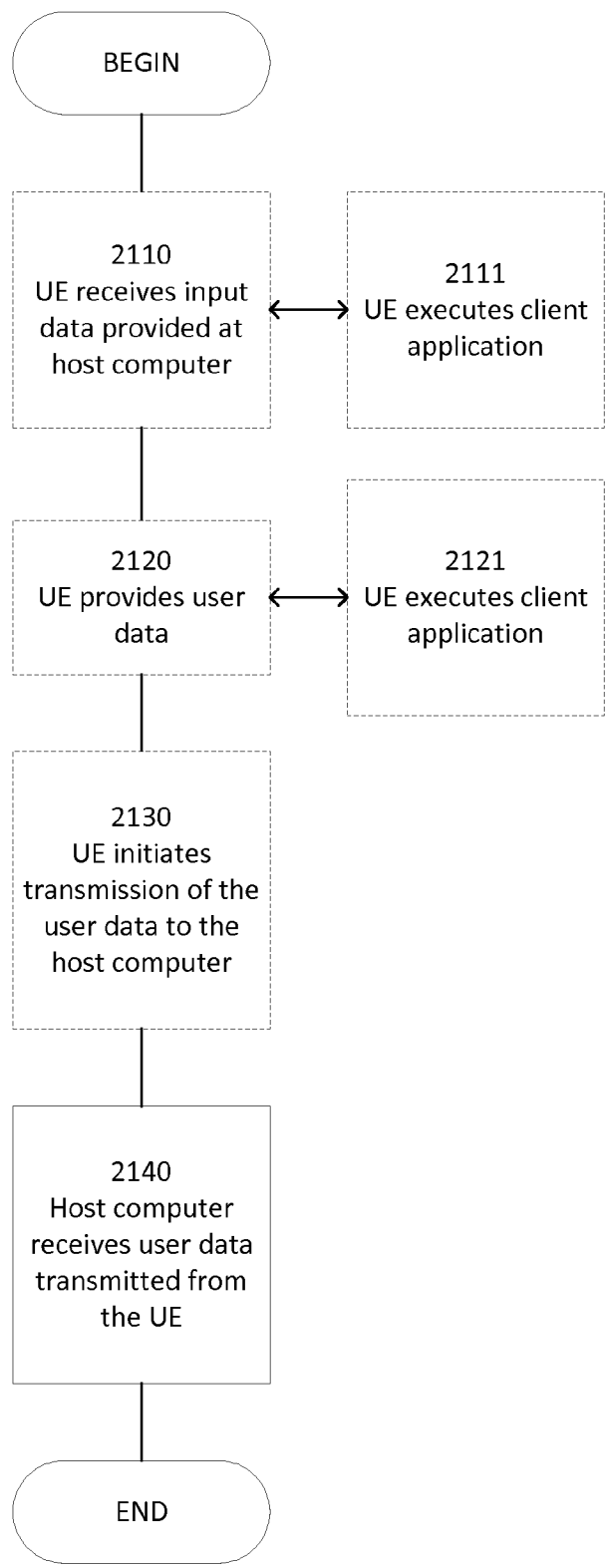

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
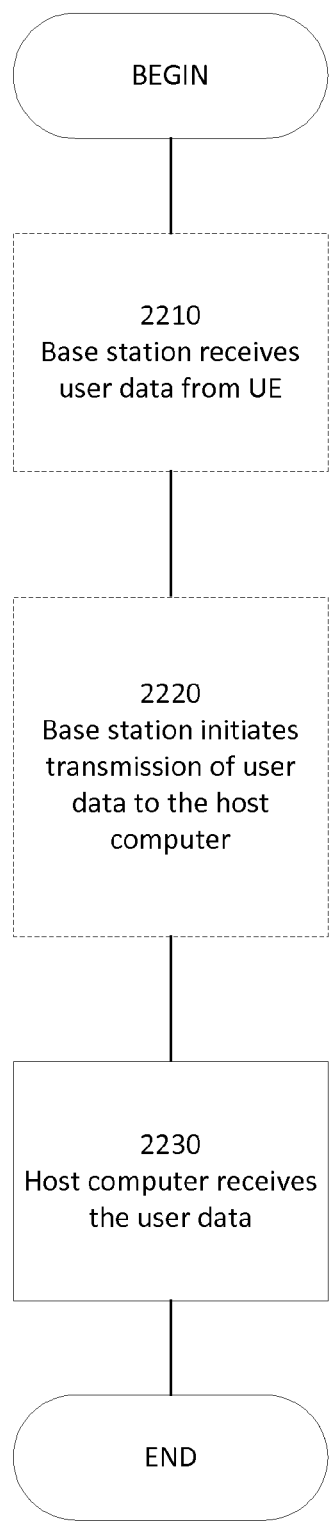

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the following, (further) exemplary embodiments are listed:

A1. A method performed by a wireless device for signalling power headroom, PH, for a supplementary uplink carrier, SUL carrier, and/or a New Radio uplink carrier, NRUC, in a cell, the method comprising:
generating at least one power headroom report, PHR, for the SUL carrier and/or the NR uplink carrier.

A2. The method of embodiment 1, comprising using a (PHR) format that is configured to support power headroom reporting for multiple uplink channels in the cell; and
transmitting the at least one PHR to a network node.

A3. The method of embodiment A2, wherein the PHR format is associated to at least one (existing) PHR MAC Control Element adapted to provide PH information for several cells in a single PHR, identifying one or both of the SUL carrier and NRUC as a target of the PHR.

A4. The method of embodiment A3, wherein the at least one (existing) PHR MAC Control Element adapted to provide PH information for several cells in a single PHR comprises a logical channel identifier (LCID) to identify the PH information as of an information associated to the SUL carrier and/or the NR uplink carrier.

A5. The method of embodiments A1-A4, wherein the PHR comprises power headroom (PH) information for one or both of the SUL carrier and the NRUC (being indicated by corresponding carrier-specific indices in the PHR).

A6. The method of embodiment A5, wherein the PH information for one or both of the SUL carrier and the NRUC is indicative of a maximum (transmission) power used (each) for calculation of a previous PH field A7. The method of embodiments A5-A6, wherein the PH information comprises a first PH value associated to the SUL carrier, a first maximum (transmission) power associated to the SUL carrier, a second PH value associated to the NRUC, and a second maximum (transmission) power associated to the NRUC.

A8. The method of embodiment A7, wherein the PHR comprises power headroom (PH) information for both of the SUL carrier and the NRUC, an wherein the PH information is determined according to a split of the maximum (transmission) power between the SUC and the NRUC.

A9. The method of embodiment A8, wherein the split is determined based on the data activity on both carriers, e.g. based on the amounts of data on both (PUSCH) channels.

A10. The method of embodiments A6-A9, wherein the maximum (transmission) power depends on user data transmission over a corresponding carrier.

A11. The method of embodiments A1-A10, wherein the SUL carrier and the NRUC each have an associated PHR format.

A12. The method of embodiment A11, wherein the PHR format associated with the SUL carrier and the PHR format associated with the NRUC are different.

A13. The method of embodiments A10-A12, wherein the PHR format for each of the SUL carrier and the NRUC is selected by the wireless device based on whether the carrier is active, e.g. is to carry user data on a shared uplink channel (e.g. PUSCH).

A14. The method of any of embodiments A10-A13, wherein the PHR format for each of the SUL carrier and the NRUC comprises one or more of the following parameters:
an interval for a periodic PH report (periodicPHR-Timer)
a timer during which PH reporting is prohibited (prohibitPHR-Timer)
a pathloss change threshold value (dl-PathlossChange)

A15. The method of any of the previous embodiments, wherein one or more of the following PHR triggers are implemented for reporting PH to the network node:
when the UE adds an SUL carrier to extend the UL coverage
when the UE removes an SUL carrier
when the UE has changed its current SUL carrier with a new SUL carrier
when the UE switches between an SUL carrier and an NR carrier for PUSCH transmission
when the UE starts the transmission of UL control signals on one carrier, while transmits the UL data on another carrier.

A16. The method of any of the previous embodiments, wherein a PH range is different for the SUL carrier and the NRUC.

A17. The method of any of the previous embodiments, further comprising selecting the PHR format based on which of the SUL carrier and the NRUC is scheduled to carry control data and/or user data.

A18. The method of any of the previous embodiments, wherein the PHR comprises PH information for one of the SUL carrier or the NRUC.

A19. The method of any of the previous embodiments, wherein a plurality of UL carriers are configured in the same serving cell.

A20. The method of any of the previous embodiments, further comprising:
providing user data; and
forwarding the user data to a host computer via the transmission to the base station.

B1. A method performed by a base station/network node for utilizing power headroom information for a supplementary uplink carrier (SUC) and/or a New Radio uplink carrier (NRUC) in a cell, the method comprising:
receiving at least one power headroom report (PHR) for the SUL carrier and/or the NR uplink carrier, the PHR using a PHR format that is configured to support power headroom reporting for multiple uplink channels in the cell; and
implementing power headroom (PH) information from the received PHR for managing wireless communication in the cell.

B2. The method of embodiment B1, wherein one or more characteristics of the PHR are in accordance with the subject matter of any of embodiments A1-19.

B3. A method performed by a base station/network node for utilizing power headroom information for a supplementary uplink carrier (SUC) and/or a New Radio uplink carrier (NRUC) in a cell, the method comprising:
configuring a UE with at least one power headroom report (PHR) to support power headroom reporting for multiple uplink channels in the cell.

B4. The method of embodiment B3, further comprising configuring features of any of embodiments A1-19.

B5. The method of any of the previous embodiments, further comprising: obtaining user data; and forwarding the user data to a host computer or a wireless device.

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
  the processing circuitry of the host computer is configured to execute a host application; and
  the UE's processing circuitry is configured to execute a client application associated with the host application, thereby providing the user data.

D18. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

D19. A method implemented in a communication system including a host computer, a base station and a user equipment (UE), the method comprising:
  at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
  at the UE, executing a client application, thereby providing the user data to be transmitted; and
  at the host computer, executing a host application associated with the client application.

D22. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device (UE), for reporting a power headroom (PH) to a network node, the UE connecting to a cell by means of a supplementary uplink (SUL) carrier and a New Radio uplink carrier (NRUC); the method comprising the UE:
   receiving a configuration to apply a first Power Headroom Report (PHR) format for a PHR reporting power headroom for multiple uplink channels in the cell;
   generating a PHR, the PHR comprising a PH information for each of the SUL carrier and the NRUC;
   transmitting the PHR to the network node; and
   the SUL carrier is configured to extend an uplink, UL, coverage of the NR uplink carrier, the PHR is indicative of a first PH value and first maximum transmission power associated to the SUL carrier, a second PH value based on a real transmission or a reference format and a second maximum transmission power associated to the NRUC, and a range of the first PH value is different from a range of the second PH value, and the PH information for each the SUL carrier and the NRUC is indicated by corresponding carrier-specific indices in the PHR.

2. The method of claim 1, wherein the PH information is determined according to a split of the maximum transmission power between the SUL carrier and the NRUC.

3. The method of claim 2, wherein the split is determined based on the data activity on both carriers.

4. The method of claim 1, wherein the first PHR format comprises one or more of:
   a time interval for a periodic PH report;
   a time during which PH reporting is prohibited; and
   a pathloss change threshold value.

5. The method of claim 1, wherein one or more of the following PHR trigger(s) are implemented for reporting PH to the network node:
   when the UE adds an SUL carrier to extend the UL coverage;
   when the UE removes an SUL carrier;
   when the UE has changed its current SUL carrier with a new SUL carrier;
   when the UE switches between an SUL carrier and an NRUC for Physical Uplink Shared Channel (PUSCH) transmission; and
   when the UE starts the transmission of UL control signals on one carrier, while transmits the UL data on another carrier.

6. The method of claim 1, wherein the configuration further comprises to apply a second PHR format for a power headroom reporting of a single uplink channel in the cell.

7. The method of claim 6, further comprising:
   using the first PHR format to provide power headroom information for both the SUL carrier and the NRUC; and
   using the second PHR format, when the UE transmits both control signals and Physical Uplink Shared Channel (PUSCH) data on the same carrier, either on the SUL carrier or on the NRUC.

8. The method of claim 6, further comprising selecting the first PHR format based on which of the SUL carrier and the NRUC is scheduled to carry one or more of control data and user data.

9. A method, performed by a base station, for utilizing power headroom (PH) information received from a wireless device (UE) configured with a supplementary uplink (SUL) carrier and a New Radio uplink carrier (NRUC) within a cell, the method comprising the base station:
   configuring the UE with a first power headroom report (PHR) format to support power headroom reporting for multiple uplink channels in the cell;
   implementing power headroom, PH, information from the received PHR for managing wireless communication in the cell;
   receiving at least one power headroom report, PHR, for the SUL carrier and the NR uplink carrier, the PHR using the first PHR format; and
   the SUL carrier is configured to extend an uplink, UL, coverage of the NR uplink carrier, and the PHR is indicative of a first PH value and a first maximum transmission power associated to the SUL carrier, and a second PH value based on a real transmission or a reference format and a second maximum transmission power associated to the NRUC, and a range of the first PH value is different from a range of the second PH value, and the PH information for each the SUL carrier and the NRUC is indicated by corresponding carrier-specific indices in the PHR.

10. The method of claim 9, wherein the PH information is determined according to a split of the maximum transmission power between the SUL carrier and the NRUC.

11. The method of claim 10, wherein the split is determined based on the data activity on both carriers.

12. The method of claim 9, wherein the first PHR format comprises one or more of the following parameters:
   a time interval for a periodic PH report;
   a time during which PH reporting is prohibited; and
   a pathloss change threshold value.

13. The method of claim 9, further comprising configuring the UE to implement one or more of the following PHR triggers for reporting PH to the network node:

when the UE adds an SUL carrier to extend the UL coverage;

when the UE removes an SUL carrier;

when the UE has changed its current SUL carrier with a new SUL carrier;

when the UE switches between an SUL carrier and an NRUC for Physical Uplink Shared Channel (PUSCH) transmission; and when the UE starts the transmission of UL control signals on one carrier, while transmits the UL data on another carrier.

14. The method of claim 9, further comprising configuring the UE to apply a second PHR format for a power headroom reporting of a single uplink channel in the cell.

15. The method of claim 14, further comprising:

receiving, from the UE, a PHR of the first PHR format comprising headroom information for both the SUL carrier and the NRUC, when the UE transmits both control signals and Physical Uplink Shared Channel (PUSCH) data on both the SUL carrier and the NRUC; or receiving, from the UE, a PHR of the second PHR format, when the UE transmits both control signals and PUSCH data on the same carrier, either on the SUL carrier or on the NR.

16. A wireless device configured to connects to a cell by means of a supplementary uplink (SUL) carrier, and a New Radio uplink carrier (NRUC), the wireless device comprising:

processing circuitry;

memory containing instructions executable by the processing circuitry whereby the wireless device is operative to:

receive a configuration to apply a first Power Headroom Report (PHR) format for a PHR reporting power headroom (PH) for multiple uplink channels in the cell to a network node;

generate a PHR, the PHR comprising a PH information for each of the SUL carrier and the NRUC;

transmit the PHR to the network node; and the SUL carrier is configured to extend an uplink, UL, coverage of the NR uplink carrier, the PHR is indicative of a first PH value and first maximum transmission power associated to the SUL carrier, and a second PH value based on a real transmission or a reference format and a second maximum transmission power associated to the NRUC, and a range of the first PH value is different from a range of the second PH value, and the PH information for each the SUL carrier and the NRUC is indicated by corresponding carrier-specific indices in the PHR.

17. A base station configured to utilize power headroom (PH) information received from a wireless device (UE) configured with a supplementary uplink (SUL) carrier and a New Radio uplink carrier (NRUC) within a cell, the base station comprising:

processing circuitry; and memory containing instructions executable by the processing circuitry the base station being configured to:

configure the UE with a first power headroom report (PHR) format to support power headroom reporting for multiple uplink channels in the cell;

implement power headroom, PH, information from the received PHR for managing wireless communication in the cell;

receive at least one power headroom report, PHR, for the SUL carrier and the NR uplink carrier, the PHR using the first PHR format; and the SUL carrier is configured to extend an uplink, UL, coverage of the NR uplink carrier, and the PHR is indicative of a first PH value and a first maximum transmission power associated to the SUL carrier, and a second PH value based on a real transmission or a reference format and a second maximum transmission power associated to the NRUC, and a range of the first PH value is different from a range of the second PH value, and the PH information for each the SUL carrier and the NRUC is indicated by corresponding carrier-specific indices in the PHR.

\* \* \* \* \*